US010032293B2

(12) United States Patent
Rifu et al.

(10) Patent No.: US 10,032,293 B2
(45) Date of Patent: Jul. 24, 2018

(54) COMPUTED TOMOGRAPHY (CT) APPARATUS AND METHOD OF RECONSTRUCTING CT IMAGE

(71) Applicant: SAMSUNG ELECTRONICS CO., LTD., Suwon-si (KR)

(72) Inventors: Toshihiro Rifu, Suwon-si (KR); Kyoung-yong Lee, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 55 days.

(21) Appl. No.: 15/010,131

(22) Filed: Jan. 29, 2016

(65) Prior Publication Data

US 2016/0225170 A1 Aug. 4, 2016

(30) Foreign Application Priority Data

Jan. 30, 2015 (KR) ......................... 10-2015-0015581

(51) Int. Cl.
*G06T 11/00* (2006.01)
*G06T 7/20* (2017.01)

(52) U.S. Cl.
CPC .............. *G06T 11/005* (2013.01); *G06T 7/20* (2013.01); *G06T 11/008* (2013.01); *G06T 2207/10076* (2013.01); *G06T 2207/10081* (2013.01)

(58) Field of Classification Search
CPC ....... G06T 11/005; G06T 11/008; G06T 7/20; G06T 2207/10072; G06T 2207/10076; G06T 2207/10081
See application file for complete search history.

(56) References Cited

U.S. PATENT DOCUMENTS

| | | | |
|---|---|---|---|
| 6,650,726 B2 | 11/2003 | Sembritzki et al. |
| 6,934,357 B2 | 8/2005 | Boyd et al. |
| 7,221,728 B2 | 5/2007 | Edic et al. |
| 7,630,528 B2 | 12/2009 | Kohler et al. |
| 8,233,691 B2 | 7/2012 | Barschdorf et al. |

(Continued)

FOREIGN PATENT DOCUMENTS

| | | |
|---|---|---|
| JP | 2007526069 A | 9/2007 |
| JP | 201359695 A | 4/2013 |
| KR | 1020140008226 A | 1/2014 |

OTHER PUBLICATIONS

Taguchi et al. "Image-Domain Motion Compensated Time-Resolved 4D cardiac CT." SPIE vol. 6510, 2007, 9 pages.*

(Continued)

*Primary Examiner* — Jon Chang
(74) *Attorney, Agent, or Firm* — Sughrue Mion, PLLC

(57) ABSTRACT

A computed tomography (CT) apparatus includes a data acquirer configured to acquire a first image corresponding to a first time point, a second image corresponding to a second time point, and a third image corresponding to a third time point based on a result of a CT scan on an object; an image reconstructor configured to acquire motion information of the object based on an amount of movement of the object between the first and second images and an amount of movement of the object between the first and third images, and obtain a target image by correcting at least one of the first, second and third images based on the motion information; and a display configured to display the target image.

18 Claims, 11 Drawing Sheets

(56) References Cited

U.S. PATENT DOCUMENTS

2009/0141968 A1* 6/2009 Sun .................. G06T 7/136
382/154
2014/0015936 A1 1/2014 Park et al.
2016/0247293 A1* 8/2016 Beylin ............... G06T 7/2086

OTHER PUBLICATIONS

Müller et al. "4-D Motion Field Estimation by Combined Multiple Heart Phase Registration (CMHPR) for Cardiac C-arm Data." IEEE Nuclear Science Symposium and Medical Imaging Conference, Oct. 27, 2012, pp. 3707-3712.*

Taguchi et al. "Toward Time Resolved Cardiac CT Images with Patient Dose Reduction: Image-based Motion Estimation." IEEE Nuclear Science Symposium Conference Record, Oct. 29, 2006, pp. 2029-2032.*

Communication dated Jul. 6, 2016, issued by the Korean Intellectual Property Office in counterpart Korean Application No. 10-2015-0015581.

\* cited by examiner

COMPUTED TOMOGRAPHY (CT) APPARATUS AND METHOD OF RECONSTRUCTING CT IMAGE

CROSS REFERENCE TO RELATED APPLICATION

This application claims priority from Korean Patent Application No. 10-2015-0015581, filed on Jan. 30, 2015, in the Korean Intellectual Property Office, the disclosure of which is incorporated herein in its entirety by reference.

BACKGROUND

1. Field

Apparatuses and methods consistent with exemplary embodiments relate to a computed tomography (CT) apparatus and a method of displaying a CT image, and more particularly, to a CT apparatus, which is capable of reconstructing a CT image based on a CT scan of a moving object, and a method of reconstructing a CT image.

2. Description of the Related Art

Medical imaging apparatuses are used to acquire images showing an internal structure of an object. The medical imaging apparatuses are non-invasive examination apparatuses that capture and process images of details of structures, tissue, fluid flow, etc., inside a body and provide the images to a user. A user, e.g., a medical practitioner, may use medical images output from the medical imaging apparatuses to diagnose a patient's condition and diseases.

A computed tomography (CT) apparatus is a representative example of an apparatus that photographs an object by emitting radiation toward the patient.

Among medical image processing apparatuses, a CT apparatus is capable of providing a cross-sectional image of an object. Furthermore, the CT apparatus may represent an internal structure (e.g., an organ such as a kidney, a lung, etc.) of the object without superimposing images, as compared to a general X-ray apparatus. Accordingly, a CT apparatus has been widely used for precise diagnosis of diseases. A medical image acquired by a CT apparatus is hereinafter referred to as a CT image.

If imaging diagnosis equipment is used to photograph an object, the object is generally repeatedly imaged in a predetermined period. In this case, if movement of the object is not constant, images of the object that are acquired by iterative imaging may not match one another. Reconstructing an image of the object based on the non-matching images may degrade the accuracy of a reconstructed image. The degradation in the accuracy of a reconstructed image may decrease accuracy in diagnosing the object.

Thus, when a CT scan of a moving object is performed, it is desirable to reconstruct a CT image having reduced motion artifacts.

SUMMARY

One or more exemplary embodiments provide an imaging diagnosis method and a computed tomography (CT) apparatus, which are capable of more accurately reconstructing an image of an object based on a result of imaging the object for disease diagnosis, and a computer-readable recording medium having a program recorded thereon for executing the method.

According to an aspect of an exemplary embodiment, there is provided a computed tomography (CT) apparatus including: a data acquirer configured to acquire a first image corresponding to a first time point, a second image corresponding to a second time point, and a third image corresponding to a third time point based on a result of a CT scan on an object; an image reconstructor configured to acquire motion information of the object based on an amount of movement of the object between the first and second images and an amount of movement of the object between the first and third images, and obtain a target image by correcting at least one of the first, second and third images based on the motion information; and a display configured to display the target image.

The first time point may follow the second time point and precede the third time point, and the image reconstructor may be configured to obtain the target image by correcting the first image in an image domain.

The image reconstructor may be configured to obtain the target image by warping the first image in the image domain based on the motion information.

The first time point may follow the second time point and precede the third time point, and the image reconstructor may be further configured to reconstruct the first image by backprojecting raw data acquired during a time interval between the first time point and the third time point and obtain the target image by correcting the first image in an image domain based on the motion information.

The first time point may follow the second time point and precede the third time point, and the image reconstructor may be configured to correct the first image by perform warping during back-projection of raw data acquired during a time interval between the first time point and the third time point based on the motion information, and obtain the target image.

The image reconstructor may be configured to reconstruct the first through third images by using a half reconstruction technique.

The CT apparatus may further include a CT gantry configured to emit an X-ray toward the object, wherein an interval between the first and second time points and an interval between the first and third time points respectively correspond to time during which the CT gantry rotates by an angle corresponding to (180 degrees+a fan angle)/2.

The first time point may follow the second time point and precede the third time point, and wherein the image reconstructor may be configured to acquire the motion information by estimating motions of the object during intervals between the first and second time points and between the first and third time points based on the amount of movement of the object between the first and second images and the amount of movement of the object between the first and third images, respectively.

The first time point may be determined based on an electrocardiogram (ECG) signal.

The motion information may include a motion vector field acquired using at least one from among block matching, non-rigid registration, and vector flow.

According to an aspect of another exemplary embodiment, there is provided a method of reconstructing a computed tomography (CT) image, the method including: acquiring a first image corresponding to a first time point, a second image corresponding to a second time point, and a third image corresponding to a third time point by performing a CT scan on an object; acquiring motion information of the object based on an amount of movement of the object between the first and second images and an amount of movement of the object between the first and third images and obtaining a target image by correcting at least one of the first, second and third images based on the motion information; and displaying the target image.

The first time point may follow the second time point and precede the third time point, and the obtaining the target image by correcting the at least one of the first, second and third images may include obtaining the target image by correcting the first image in an image domain.

The obtaining the target image by correcting the first image in the image domain may include warping the first image in the image domain based on the motion information.

The first time point may follow the second time point and precede the third time point, and the obtaining the target image by correcting the at least one of the first, second and third images may include reconstructing the first image by backprojecting raw data acquired during a time interval between the first time point and the third time point and obtaining the target image by correcting the first image based on the motion information.

The first time point may follow the second time point and precede the third time point, and the obtaining the target image by correcting the at least one of the first, second and third images may include correcting the first image by warping during back-projection of raw data acquired during a time interval between the first time point and the third time point based on the motion information and obtaining the target image.

The obtaining the target image by correcting the at least one of the first, second and third images may include reconstructing the first through third images by using a half reconstruction technique.

An interval between the first and second time points and an interval between the first and third time points may respectively correspond to time during which the CT gantry rotates by an angle corresponding to (180 degrees+a fan angle)/2.

The acquiring the motion information may include acquiring the motion information by estimating motions of the object during intervals between the first and second time points and between the first and third time points based on the amount of movement of the object between the first and second images and the amount of movement of the object between the first and third images, respectively.

The first time point may be determined based on an electrocardiogram (ECG) signal.

The motion information may include a motion vector field acquired using at least one from among block matching, non-rigid registration, and vector flow.

The method may further include displaying a screen including the target image.

According to an aspect of still another exemplary embodiment, there is provided a non-transitory computer-readable recording medium having recorded thereon a program including instructions, which, when executed by a computer, cause the computer to perform the method of claim 11.

According to an aspect of still another exemplary embodiment, there is provided an apparatus for processing a medical image, the apparatus including: an image processor configured to acquire a plurality of images of an object respectively captured at different time points based on a result of a CT scan on the object, and configured to correct a target image of the object, among the plurality of images, based on estimated motion of the object between the target image and at least one image adjacent to the target image; and a display configured to display the corrected target image.

BRIEF DESCRIPTION OF THE DRAWINGS

The above and/or other aspects will be more apparent by describing certain example embodiments with reference to the accompanying drawings.

DETAILED DESCRIPTION

Figure 1A:
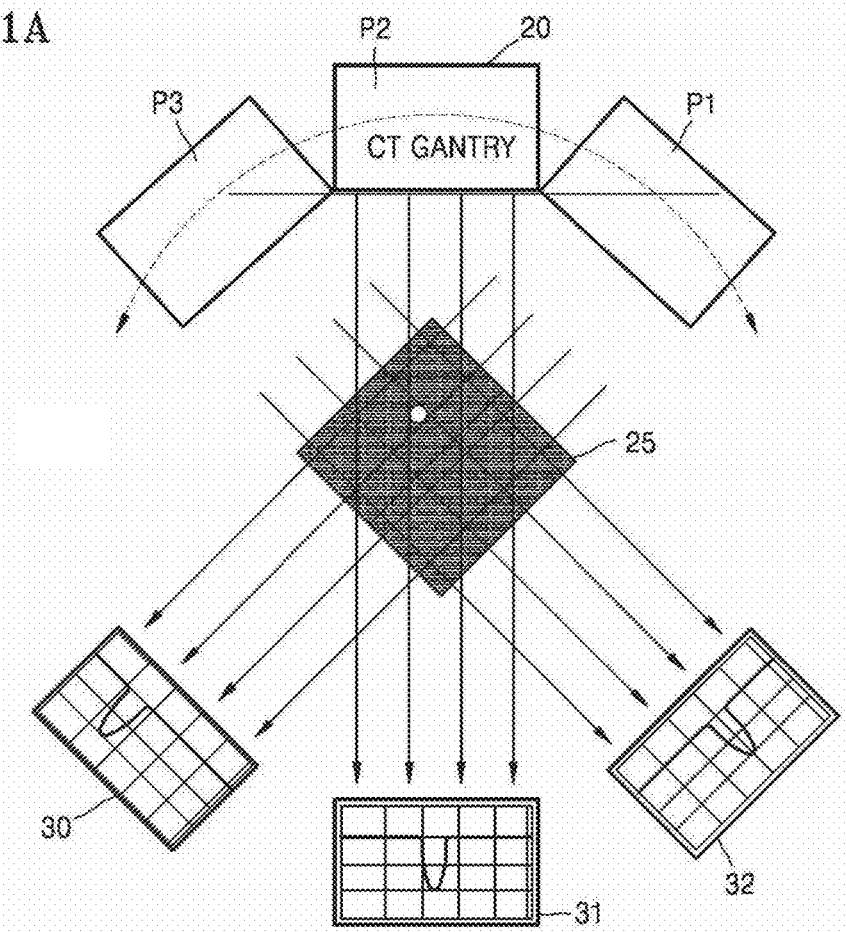
FIGS. 1A and 1B are diagrams for explaining computed tomography (CT) scanning and reconstruction operations.

Certain exemplary embodiments will now be described in greater detail with reference to the accompanying drawings.

In this regard, the exemplary embodiments may have different forms and should not be construed as being limited to the descriptions set forth herein. Rather, these embodiments are provided so that this disclosure will be thorough and complete and will fully convey the concept of the exemplary embodiments to one of ordinary skill in the art, and the disclosure will only be defined by the appended claims. Like reference numerals refer to like elements throughout the specification.

All terms including descriptive or technical terms which are used herein should be construed as having meanings that are obvious to one of ordinary skill in the art. However, the terms may have different meanings according to the intention of one of ordinary skill in the art, precedent cases, or the appearance of new technologies. Also, some terms may be arbitrarily selected by the applicant, and in this case, the meaning of the selected terms will be described in detail in the detailed description of the invention. Thus, the terms used herein have to be defined based on the meaning of the terms together with the description throughout the specification.

When a part "includes" or "comprises" an element, unless there is a particular description contrary thereto, the part can further include other elements, not excluding the other elements. Also, the term "unit" in the exemplary embodiments means a software component or hardware component such as a field-programmable gate array (FPGA) or an application-specific integrated circuit (ASIC), and performs a specific function. However, the term "unit" is not limited to software or hardware. The "unit" may be formed to be in an addressable storage medium, or may be formed to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units".

Reference will now be made in detail to embodiments, examples of which are illustrated in the accompanying drawings. In this regard, the exemplary embodiments may have different forms and should not be construed as being limited to the descriptions set forth herein. In the following description, well-known functions or constructions are not described in detail so as not to obscure the embodiments with unnecessary detail. As used herein, the term "and/or" includes any and all combinations of one or more of the associated listed items. Expressions such as "at least one of," when preceding a list of elements, modify the entire list of elements and do not modify the individual elements of the list.

Throughout the specification, an "image" may mean multi-dimensional data formed of discrete image elements, e.g., pixels in a two-dimensional (2D) image and voxels in a three-dimensional (3D) image. For example, the image may include a medical image of an object which is captured by a computed tomography (CT) imaging apparatus.

Throughout the specification, a "CT image" may mean an image generated by synthesizing a plurality of X-ray images that are obtained by photographing an object while a CT imaging apparatus rotates around at least one axis with respect to the object.

Furthermore, in the specification, an "object" may be a human, an animal, or a part of a human or animal. For example, the object may be an organ (e.g., the liver, heart, womb, brain, breast, or abdomen), a blood vessel, or a combination thereof. The object may be a phantom. The phantom means a material having a density, an effective atomic number, and a volume that are approximately the same as those of an organism. For example, the phantom may be a spherical phantom having properties similar to the physical body.

Throughout the specification, a "user" may be, but is not limited to, a medical expert including a medical doctor, a nurse, a medical laboratory technologist, a medial image expert, or a technician who repairs a medical apparatus.

Since a CT system is capable of providing a cross-sectional image of an object, the CT system may distinctively express an inner structure, e.g., an organ such as a kidney or a lung, of the object, compared to a general X-ray imaging apparatus.

The CT system may obtain a plurality of pieces of image data with a thickness not more than 2 mm several tens to several hundred times per second and then may process the plurality of pieces of image data, so that the CT system may provide a relatively accurate cross-sectional image of the object. According to the related art, only a horizontal cross-sectional image of the object can be obtained, but this issue has been overcome due to various image reconstruction methods. Examples of 3D image reconstruction methods are as below:

Shade surface display (SSD)—an initial 3D imaging method of displaying only voxels having a predetermined Hounsfield Units (HU) value.

Maximum intensity projection (MIP)/minimum intensity projection (MinIP)—a 3D imaging method of displaying only voxels having the greatest or smallest HU value from among voxels that construct an image.

Volume rendering (VR)—an imaging method capable of adjusting a color and transmittance of voxels that constitute an image, according to an area of interest.

Virtual endoscopy—a method that allows endoscopy observation in a 3D image that is reconstructed by using the VR method or the SSD method.

Multi-planar reformation (MPR)—a method of reconstructing an image into a different cross-sectional image. A user may reconstruct an image in any desired direction.

Editing—a method of editing adjacent voxels to allow a user to easily observe an area of interest in volume rendering.

Voxel of interest (VOI)—a method of displaying only a selected area in volume rendering.

Figure 1B:
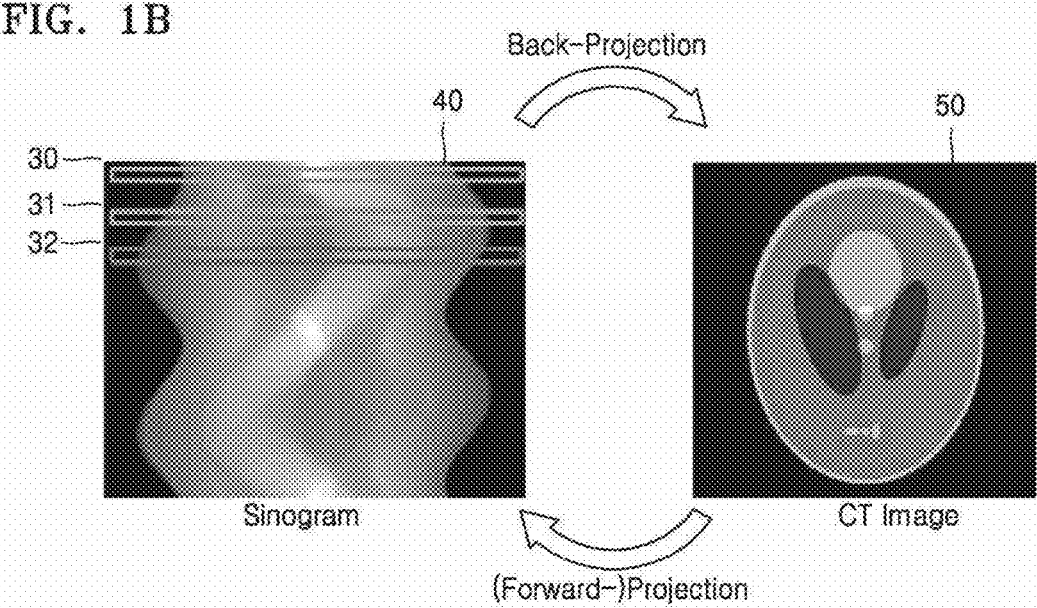

FIGS. 1A and 1B are diagrams for explaining computed tomography (CT) scanning and reconstruction operations.

To obtain a CT image, a CT apparatus performs a CT scan of an object to acquire raw data. The acquired raw data is used to reconstruct a CT image. In this case, the raw data may be projection data obtained by projecting an X-ray onto the object or a projection data set called a sinogram.

For example, to obtain a CT image, image reconstruction may be performed on a sinogram obtained by performing a CT scan.

Referring to FIG. 1A, a CT gantry 20 included in a CT apparatus emits an X-ray toward an object 25. When the CT apparatus performs a CT scan, the CT gantry 20 rotates around the object 25 while acquiring a plurality of pieces of raw data, i.e., first through third raw data 30, 31, and 32 corresponding to rotational angles, respectively. In detail, the CT gantry 20 acquires the first through third raw data 30 through 32 by respectively detecting X-rays that are emitted onto the object 25 at positions P1, P2, and P3. In this case, the first through third raw data 30 through 32 may be projection data.

To produce a cross-sectional CT image, the CT gantry 20 may rotate by an angle that is greater than or equal to 180 degrees during a CT scan.

Referring to FIG. 1B, a plurality of pieces of projection data 30 through 32 that are acquired by moving the CT gantry 20 at predetermined angular intervals as described with respect to FIG. 1A are combined into a single sinogram 40. The sinogram 40 is obtained by performing a CT scan in one period during which the CT gantry 20 rotates. The sinogram 40 corresponding to one period of rotation may be used to generate one cross-sectional CT image. During the one period of rotation, the CT gantry 20 may rotate by an angle that is greater than or equal to 180 or 360 degrees depending on the specification of a CT system.

The sinogram 40 is then back-projected to reconstruct a CT image 50.

Back-projection is a process of mapping values of each projection data to all points on a straight line from which the projection data is acquired. In other words, when a portion corresponding to a cross-section from each projection data is projected into an image along a direction in which the projection data is acquired, the image becomes sharper. The image obtained as a result of the back-projection is provided as a cross-sectional image of an object.

In general, it takes about 0.2 seconds for the CT gantry 20 to rotate 180 degrees. However, movement of the object (e.g., a fast moving object such as the heart) may still occur during one period of rotation. Due to the movement of the object, motion artifacts may occur during reconstruction of a CT image.

Furthermore, a 3D CT image may be reconstructed using a plurality of cross-sectional CT images. Thus, movement of an object may occur during acquisition of raw data to be used to reconstruct a 3D CT image.

When motion artifacts occur, boundaries of an object in a reconstructed CT image may appear blurred, or a reconstructed image may be unclear. Thus, motion artifacts introduced in a CT image reduce the quality of a CT image and accordingly, degrade the diagnosis of a disease by a user such as a medical practitioner.

Figure 2:
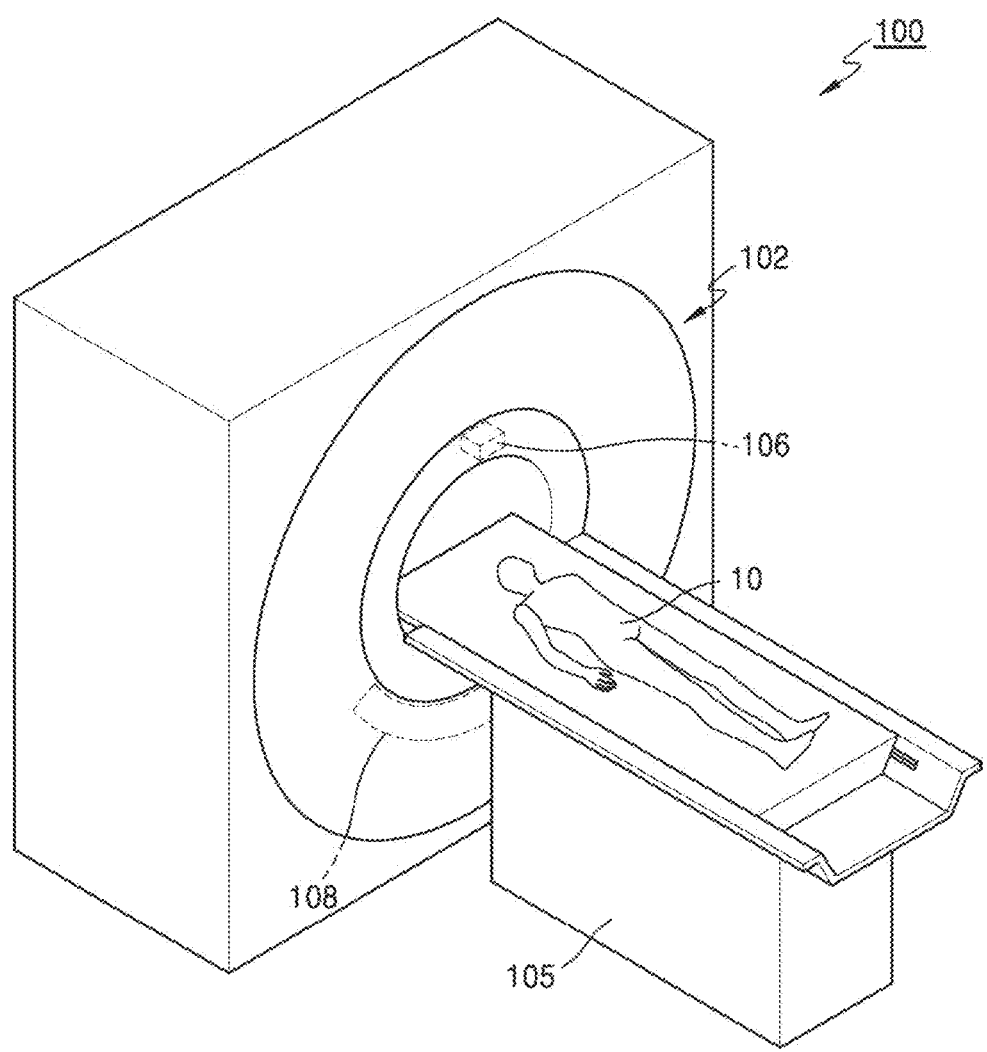
FIG. 2 is a schematic diagram illustrating a CT system according to an exemplary embodiment.
Figure 3:
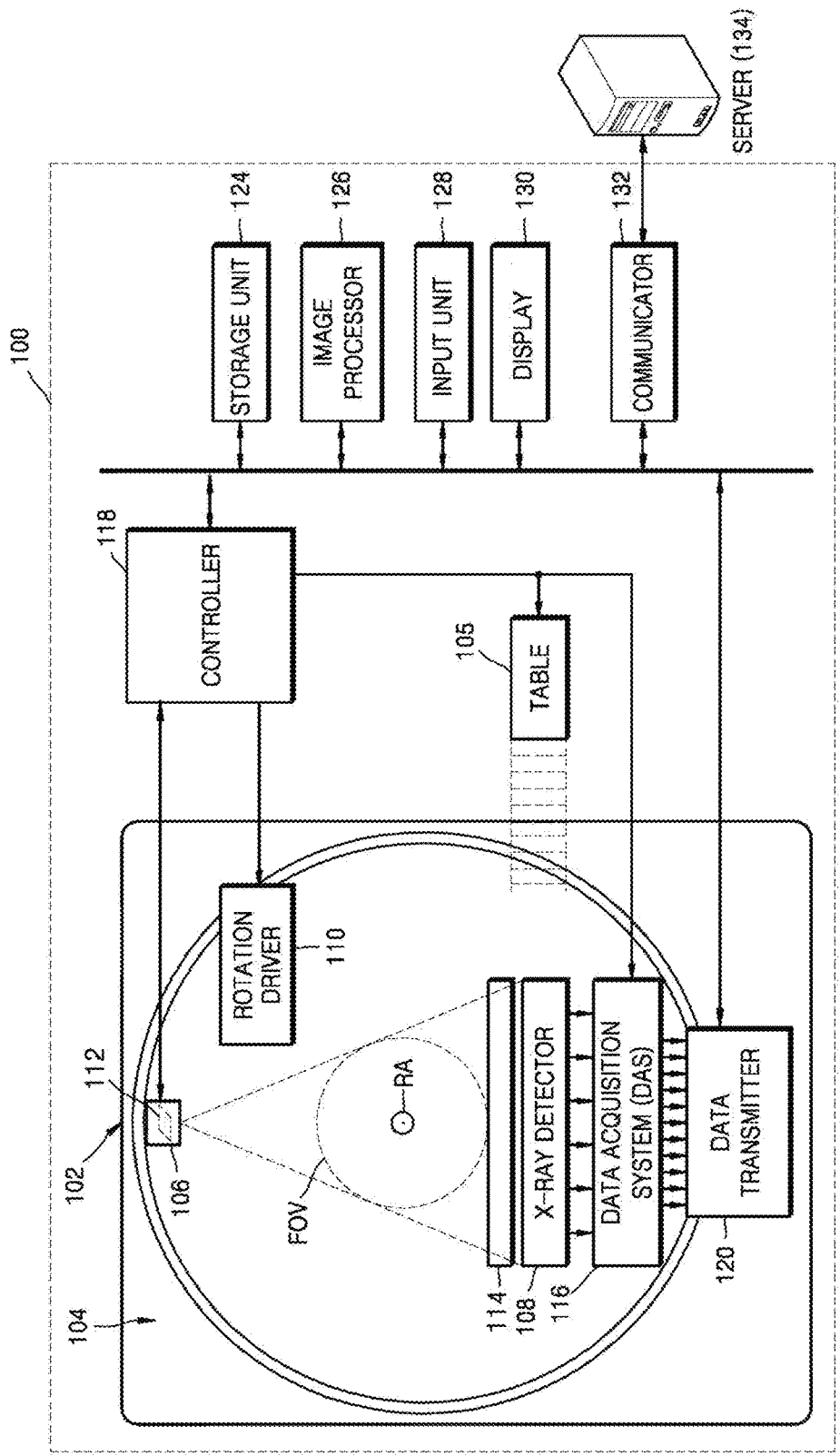
FIG. 3 is a diagram illustrating a structure of a CT system according to an exemplary embodiment.

FIG. 2 is a schematic view illustrating a CT system 100, and FIG. 3 is a block diagram illustrating a structure of the CT system 100.

The CT system 100 may include a gantry 102, a table 105, a controller 118, a storage unit 124, an image processor 126, an input unit 128, a display 130, and a communicator 132.

An object 10 may be positioned on the table 105. In the exemplary embodiment, the table 105 may move in a predetermined direction (e.g., at least one of up, down, right, and left directions), and movement of the table 105 may be controlled by the controller 118.

The gantry 102 may include a rotating frame 104, an X-ray generator 106, an X-ray detector 108, a rotation driver 110, a data acquisition system (DAS) 116, and a data transmitter 120.

The gantry 102 may include the rotating frame 104 having a loop shape capable of rotating with respect to a predetermined rotation axis RA. Also, the rotating frame 104 may have a disc shape.

The rotating frame 104 may include the X-ray generator 106 and the X-ray detector 108 that are arranged to face each other to have predetermined fields of view FOV. The rotating frame 104 may also include an anti-scatter grid 114. The anti-scatter grid 114 may be positioned between the X-ray generator 106 and the X-ray detector 108.

In a medical imaging system, X-ray radiation that reaches a detector (or a photosensitive film) includes not only attenuated primary radiation that forms a valuable image but also scattered radiation that deteriorates the quality of an image. To increase efficiency in transmitting the primary radiation and to attenuate the scattered radiation, the anti-scatter grid 114 may be positioned between a patient and the detector (or the photosensitive film).

For example, the anti-scatter grid 114 may be formed by alternately stacking lead foil strips and an interspace material such as a solid polymer material, solid polymer, or a fiber composite material. However, formation of the anti-scatter grid 114 is not limited thereto.

The rotating frame 104 may receive a driving signal from the rotation driver 110 and may rotate the X-ray generator 106 and the X-ray detector 108 at a predetermined rotation speed. The rotating frame 104 may receive the driving signal and power from the rotation driver 110 while the rotating frame 104 contacts the rotation driver 110 via a slip ring (not shown). Also, the rotating frame 104 may receive the driving signal and power from the rotation driver 110 via wireless communication.

The X-ray generator 106 may receive a voltage and current from a power distribution unit (PDU) (not shown) via a slip ring and a high voltage generator (not shown), and may generate and emit an X-ray. When the high voltage generator applies predetermined voltage (hereinafter, referred to as a tube voltage) to the X-ray generator 106, the X-ray generator 106 may generate X-rays having a plurality of energy spectra that correspond to the tube voltage.

The X-ray generated by the X-ray generator 106 may be emitted in a predetermined form due to a collimator 112.

The X-ray detector 108 may be positioned to face the X-ray generator 106. Each of a plurality of X-ray detecting devices may establish one channel but exemplary embodiments are not limited thereto.

The X-ray detector 108 may detect the X-ray that is generated by the X-ray generator 106 and transmitted through the object 10, and may generate an electrical signal corresponding to the intensity of the detected X-ray.

The X-ray detector 108 may include an indirect-type X-ray detector for detecting radiation after converting the radiation into light, and a direct-type X-ray detector for detecting radiation after directly converting the radiation into electric charges. The indirect-type X-ray detector may use a scintillator. Also, the direct-type X-ray detector may use a photon counting detector. The DAS 116 may be connected to the X-ray detector 108. Electrical signals generated by the X-ray detector 108 may be acquired by the DAS 116. Also, the electrical signals generated by the X-ray detector 108 may be provided to an analog-to-digital converter (not shown) via an amplifier (not shown).

According to a slice thickness or the number of slices, only some of a plurality of pieces of data collected by the X-ray detector 108 may be provided to the image processor 126 via the data transmitter 120, or the image processor 126 may receive the plurality of pieces of data and select only some of the plurality of pieces of data among a plurality of pieces of data received.

A digital signal obtained by performing analog-to-digital conversion on the electrical signals generated by the X-ray detector 108 may be provided to the image processor 126 via the data transmitter 120. The digital signal may be provided to the image processor 126 by wire or wirelessly.

The controller 118 may control an operation of each of the elements in the CT system 100. For example, the controller 118 may control operations of the table 105, the rotation driver 110, the collimator 112, the DAS 116, the storage unit 124, the image processor 126, the input unit 128, the display 130, the communicator 132, or the like.

The image processor 126 may receive data acquired by the DAS 116 (e.g., data before processing), via the data transmitter 120, and may perform pre-processing on the received data.

The pre-processing may include, for example, a process of correcting a sensitivity irregularity between channels and a process of correcting signal loss due to a rapid decrease in signal strength or due to the presence of an X-ray absorbing material such as metal.

Data output from the image processor 126 may be referred to as raw data or projection data. The projection data may be stored in the storage unit 124 along with imaging conditions (e.g., the tube voltage, an imaging angle, etc.) during the acquisition of data.

The projection data may be a group of data values that correspond to the intensity of the X-ray that has passed through the object 10. For convenience of description, a group of a plurality of pieces of projection data that are simultaneously obtained from all of channels at the same imaging angle is referred to as a projection data set.

The storage unit 124 may include at least one storage medium from among a flash memory-type storage medium, a hard disk-type storage medium, a multimedia card micro-type storage medium, a card-type memory (e.g., a secure digital (SD) card, an extreme digital (XD) memory, and the like), a random access memory (RAM), a static random access memory (SRAM), a read-only memory (ROM), an electrically erasable programmable ROM (EEPROM), a programmable ROM (PROM), a magnetic memory, a magnetic disc, and an optical disc.

The image processor 126 may reconstruct a cross-sectional image of the object 10 by using the acquired projection data set. The cross-sectional image may be a 3D image. In other words, the image processor 126 may reconstruct a 3D image of the object 10 by using a reconstruction method, e.g., a cone beam reconstruction method or the like, based on the acquired projection data set.

The input unit 128 may receive an external input with respect to an X-ray tomography imaging condition, an image processing condition, or the like. For example, the X-ray tomography imaging condition may include tube voltages, an energy value setting with respect to a plurality of X-rays, a selection of an imaging protocol, a selection of an image reconstruction method, a setting of an FOV area, the number of slices, a slice thickness, a parameter setting with respect to image post-processing, or the like. Also, the image processing condition may include a resolution of an image, an attenuation coefficient setting for the image, setting for an image combining ratio, or the like.

The input unit 128 may include a device for receiving a predetermined input from an external source or from a user. For example, the input unit 128 may include a microphone, a keyboard, a mouse, a joystick, a touch pad, a touch pen, a voice recognition device, a gesture recognition device, or the like.

The display 130 may display an X-ray image reconstructed by the image processor 126.

Exchanges of data, power, or the like between the aforementioned elements may be performed by using at least one of wired communication, wireless communication, and optical communication.

The communicator 132 may perform communication with an external device, an external medical apparatus, etc. via a server 134 or the like. The communication will now be described with reference to FIG. 4.

Figure 4:
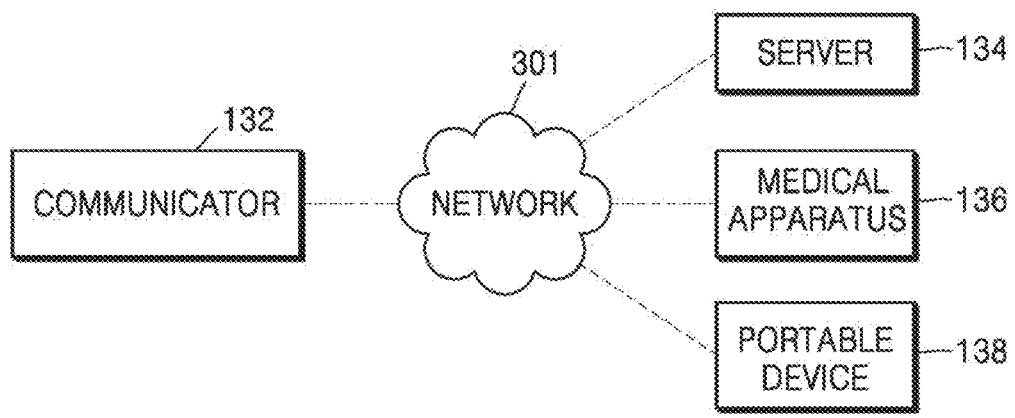
FIG. 4 is a diagram illustrating communication performed by a communicator.

FIG. 4 is a block diagram illustrating communication performed by the communicator 132.

The communicator 132 may be connected to a network 301 by wire or wirelessly and therefore may perform communication with the server 134, a medical apparatus 136, or a portable device 138. The communicator 132 may exchange data with a hospital server or other medical apparatuses in a hospital connected via a picture archiving and communication system (PACS).

Also, the communicator 132 may perform data communication with the portable device 138 or the like, according to the digital imaging and communications in medicine (DICOM) standard.

The communicator 132 may transmit and receive data related to diagnosing the object 10, via the network 301. Also, the communicator 132 may transmit and receive a medical image obtained from the medical apparatus 136 such as a magnetic resonance imaging (MRI) apparatus, an X-ray apparatus, or the like.

Furthermore, the communicator 132 may receive a diagnosis history or a medical treatment schedule about a patient from the server 134 and may use the diagnosis history or the medical treatment schedule to diagnose the patient. Also, the communicator 132 may perform data communication not only with the server 134 or the medical apparatus 136 in a hospital but also with the portable device 138 of a user or patient.

Also, the communicator 132 may transmit information about a device error, information about a quality control status, or the like to a system manager or a service manager via the network 301, and may receive feedback regarding the information from the system manager or service manager.

Figure 5:
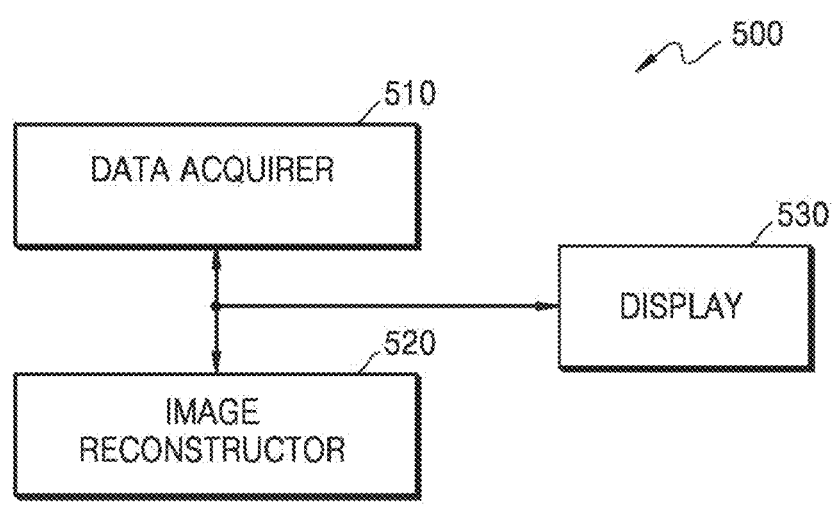
FIG. 5 is a block diagram of a configuration of a CT apparatus according to an exemplary embodiment.

Referring to FIG. 5, a CT apparatus 500 according to an exemplary embodiment includes a data acquirer 510, an image reconstructor 520, and a display 530.

The CT apparatus 500 may be included in the CT system 100 described with reference to FIGS. 2 and 3. Furthermore, the CT apparatus 500 may operate as an apparatus for processing a medical image and may be included in the medical apparatus 136 or the portable device 138 described with reference to FIG. 4 and/or connected to the CT system 100 for operation thereof. In this case, the data acquirer 610 may receive raw data from the CT system 100 instead of performing a CT scan of an object.

If the CT apparatus 500 is included in the CT system 100, the data acquirer 510 and the image reconstructor 520 may be included in the image processor 126 shown in FIG. 3.

The data acquirer 510 performs a CT scan of an object to acquire a first image corresponding to a first time point, a second image corresponding to a second time point that is at a predetermined time interval before the first time point, and a third image corresponding to a third time point that is at the predetermined time interval after the first time point. In detail, the data acquirer 510 may obtain raw data and reconstruct the first through third images respectively corresponding to the first through third time points based on the raw data. In this case, the first through third images each may be 2D or 3D CT images. A 2D CT image may also be referred to as a cross-sectional CT image.

The image reconstructor 520 acquires motion information of the object based on first information corresponding to the amount of movement of the object between the first and second images and second information corresponding to the amount of movement of the object between the first and third images. The image reconstructor 520 acquires a target image by correcting the first image based on the acquired motion information.

In detail, the image reconstructor 520 acquires first information indicating a relationship between time and the amount of movement of the object between the first and second images, based on the amount of movement of the object between the first and second images. In this case, the amount of movement of the object may be a difference in at least one of a status, size, and position between the object in the first image and the object in the second image.

Furthermore, the image reconstructor 520 acquires second information indicating a relationship between time and the amount of movement between the first and third images, based on the amount of movement of the object between the first and third images.

The image reconstructor 520 may also acquire motion information obtained by estimating motions during intervals between the first and second time points and between the first and third time points, based on the first and second information. Furthermore, the image reconstructor 520 may correct the motion information by comparing the acquired motion information with measurement data. The image reconstructor 520 may acquire an improved target image by correcting the first image based on the corrected motion information, as described in more detail later with reference to FIG. 9.

In this case, if an X-ray that has passed through the object is detected, and raw data is generated using the detected X-ray, the measurement data may be an image reconstructed using raw data acquired in a time interval corresponding to an arbitrary time point.

The display 530 displays a reconstructed CT image. In detail, the display 530 displays a target image. Since the display 530 corresponds to the display 130 shown in FIG. 3, the same descriptions that are already provided above with respect to FIG. 3 are omitted.

Figure 6:
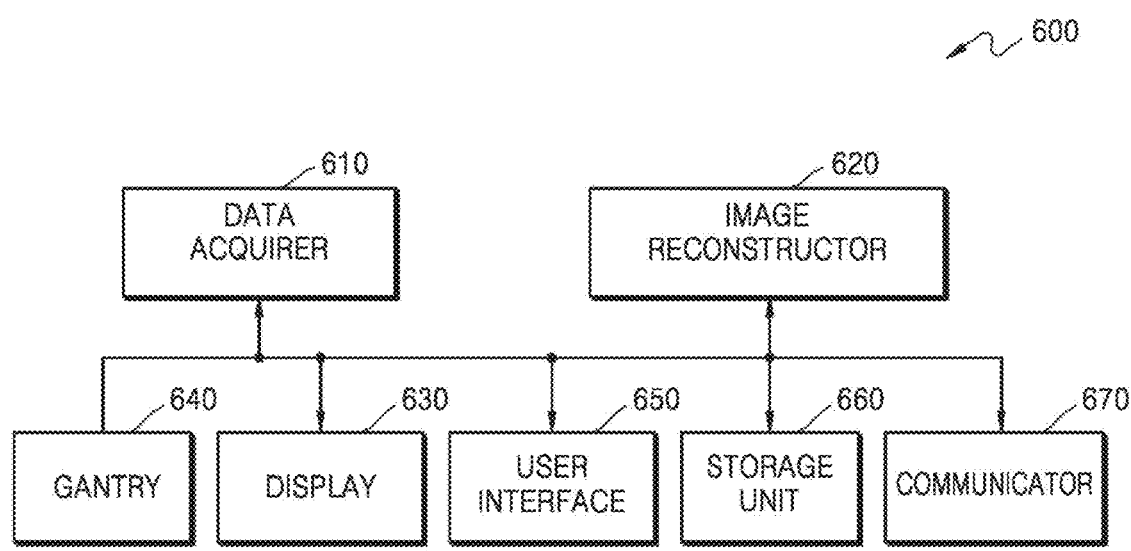
FIG. 6 is a block diagram of a configuration of a CT apparatus according to another exemplary embodiment.

FIG. 6 is a block diagram of a configuration of a CT apparatus 600 according to another exemplary embodiment.

Referring to FIG. 6, the CT apparatus 600 according to an exemplary embodiment includes a data acquirer 610, an image reconstructor 620, and a display 630 that respectively correspond to the data acquirer 510, the image reconstructor 520, and the display 530 shown in FIG. 5. Thus, the same descriptions that are already provided above with respect to FIG. 5 are omitted.

The CT apparatus 600 may further include at least one of a gantry 640, a user interface 650, a storage unit 660, and a communicator 670. Since the display 630, the gantry 640, the user interface 650, the storage unit 660, and the communicator 670 respectively have the same configurations and perform the same operations as the display 130, the gantry 102, the input unit 128, the storage unit 124, and the communicator 132 shown in FIG. 3, the same descriptions that are already provided above with respect to FIG. 3 are omitted.

The image reconstructor 620 acquires motion information based on first information indicating the amount of movement of the object between a first image and a second image and second information indicating the amount of the object of movement between the first image and a third image.

The image reconstruction information 620 may acquire a target image by correcting the first image in an image domain based on the motion information.

In detail, the image reconstructor 620 may reconstruct a first image by back-projecting raw data acquired during a first time interval corresponding to a first time point. Then, the image reconstructor 620 may acquire a target image by correcting the first image in the image domain based on the motion information.

The gantry 640 includes the X-ray generator (106 of FIG. 3), the X-ray detector (108 of FIG. 3), and the DAS (116 of FIG. 3). The gantry 640 emits an X-ray toward an object, detects the X-ray that has passed through the object, and generates raw data corresponding to the detected X-ray. In detail, the X-ray generator 106 generates an X-ray and emits the X-ray toward the object while rotating around the object. The X-ray detector 108 then detects the X-ray that has passed through the object. The DAS 116 generates raw data corresponding to the detected X-ray. In this case, the raw data may be projection data acquired by emitting radiation toward the object or a projection data set called a sinogram.

A method of reconstructing a cross-sectional CT image from raw data acquired during rotation of the X-ray generator 106 by 180 degrees is hereinafter referred to as a half reconstruction technique. A method of reconstructing a cross-sectional CT image from raw data acquired during rotation of the X-ray generator 106 by 360 degrees is hereinafter referred to as a full reconstruction technique. Furthermore, 'one period' is hereinafter defined as a time or angular range over which the X-ray generator 106 rotates to acquire raw data, which is used to reconstruct a cross-sectional CT image. For example, in a half reconstruction technique, one period corresponds to an angular range that is greater than or equal to 180 degrees. In a full reconstruction technique, one period corresponds to an angular range that is greater than or equal to 360 degrees. For example, in the half reconstruction technique, it is assumed that a fan angle is 60° or 120° and one period of an angular interval may be 180 degrees plus the fan angle, e.g., about 240 degrees (180°+60°) or 300 degrees (180°+120°). In the full reconstruction technique, one period of an angular interval may be 360 degrees plus a fan angle, e.g., about 420 degrees (360°+60°).

The CT apparatuses 500 and 600 according to the exemplary embodiments may use the full reconstruction technique and/or half reconstruction technique.

In detail, the gantry 640 performs a CT scan by using at least one of the half and full reconstruction techniques to acquire raw data. The data acquirer 610 may reconstruct first through third images by using pieces of raw data that are transmitted by the gantry 640 or a CT system externally connected thereto.

The user interface 650 may generate and output a user interface screen to receive a predetermined command or data from the user and receive the predetermined command or data from the user via the user interface screen. Furthermore, the user interface screen output from the user interface 650 is output to the display 630. Then, the display 630 may display the user interface screen. The user may view the user interface screen displayed on the display 630 and recognize predetermined information and input a predetermined command or data.

The user interface 650 may include a mouse, a keyboard, or another input device including hard keys for inputting predetermined data. For example, the user may input predetermined data or a command by manipulating at least one of the mouse, the keyboard, and the other input device included in the user interface 650.

As another example, the user interface 650 may be provided in a form of a touch pad. In detail, the user interface 650 includes a touch pad (not shown) combined with a display panel (not shown) of the display 630 and outputs a user interface screen to the display panel. When a predetermined command is input via the user interface screen, the touch pad may detect the predetermined command input and recognize the predetermined command input by the user.

In detail, if the user interface 650 is formed as a touch pad, when the user touches a predetermined point on the user interface screen, the user interface 650 detects a touched point. The user interface 650 may then transmit information about the detected touched point to the image reconstructor 620. The image reconstructor 620 may then recognize a user request or command corresponding to a menu displayed at the detected point and reconstruct a CT image according to the recognized user request or command.

The storage unit 660 may store data that is acquired during a CT scan. In detail, the storage unit 660 may store at least one of projection data that is raw data and a sinogram. The storage unit 660 may also store various pieces of data, programs, and the like that are used to reconstruct a CT image, as well as a final reconstructed CT image. Furthermore, the storage unit 660 may store various pieces of data, based on which first information is acquired, and the acquired first information.

The storage unit 660 may include at least one storage medium from among a flash memory-type storage medium, a hard disk-type storage medium, a multimedia card micro-type storage medium, a card-type memory (e.g., an SD card, an XD memory, and the like), Random Access Memory (RAM), Static Random Access Memory (SRAM), Read- Only Memory (ROM), Electrically Erasable Programmable ROM (EEPROM), PROM, magnetic memory, a magnetic disc, and an optical disc.

The communicator 670 may communicate with an external device, an external medical apparatus, etc. For example, the communicator 670 may be connected to an external CT system or CT apparatus to receive first through third images. Alternatively, the communicator 670 may receive raw data that is used to reconstruct the first through third images. In this case, the data acquirer 610 may receive raw data used to reconstruct a first image, a second image, and/or a third image to reconstruct the first image, the second image, and/or the third image based on the received raw data.

As described above, during a CT scan of a fast moving object such as the heart, motion artifacts are introduced in a reconstructed CT image. The operation of the CT apparatus 600 that may enhance image quality by reducing motion artifacts will now be described in detail with reference to FIGS. 7 through 10.

Figure 7A:
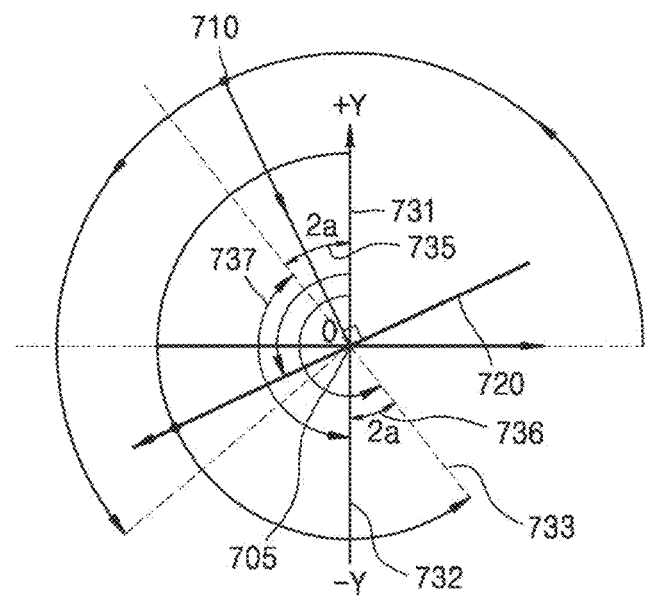
FIGS. 7A and 7B are diagrams for explaining reconstruction of a CT image using a half reconstruction technique.
Figure 7B:
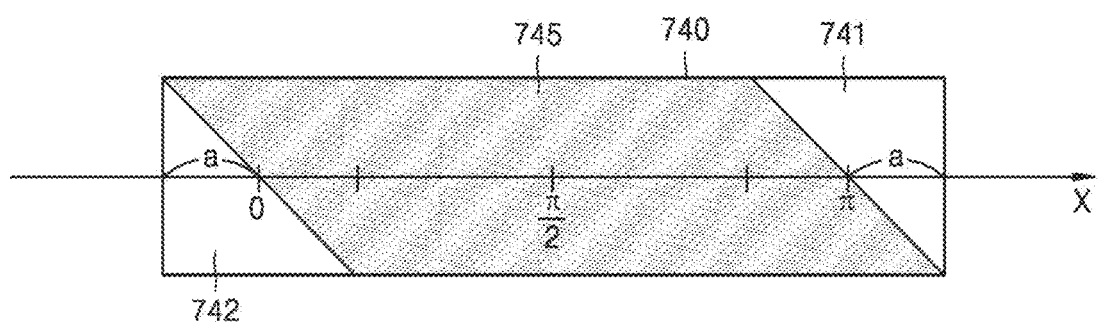

FIGS. 7A and 7B are diagrams for explaining reconstruction of a CT image using a half reconstruction technique. In detail, FIG. 7A is a diagram for explaining rotation of the X-ray generator (106 of FIG. 3), and FIG. 7B is a diagram for explaining a weight that is applied to projection data that is raw data If the X-ray generator 106 emits a fan-shaped beam that diverges from a predetermined point in a fan shape, during half reconstruction, a CT scan is performed by rotating the X-ray generator 106 by 180 degrees plus a fan angle. In this case, the fan angle is defined as an extra angle by which the X-ray generator 106 rotates if a cone beam having a fan shape is used and may be a value of approximately 60° or 120°. In FIGS. 7A and 7B, a fan angle 2a is 60°, and thus one period of an angular interval for half reconstruction is 180 degrees plus the fan angle (2a=60°), i.e., 240°.

Referring to FIG. 7A, when the X-ray generator 106 emits an X-ray beam towards an object 705, the X-ray detector 108 detects the X-ray beam from a detection surface 720. A position 710 of the X-ray beam moves in a circle around the object 705 and rotates by one period of an angular interval, i.e., 180°+2a. The detection surface 720 rotates by an angle corresponding to the position 710. In detail, the position 710 moves by an angle of 180 degrees from a positive Y-axis to a negative Y-axis and then further by the fan angle of 2a to reach a position 733.

FIG. 7B illustrates projection data 740 used to reconstruct a cross-sectional CT image. The X-axis denotes one period of an angular interval or time during which the projection data 740 is acquired. Furthermore, when a cone beam having a fan shape is used, an X-ray is emitted toward the object 705 in the same direction during first and second angular segments 735 and 736. Thus, to prevent duplicate sampling of the same portion of the object 705, a weight may be applied to projection data. In detail, final projection data 740 may be produced by applying weights to pieces of projection data 742 and 741 respectively acquired during the first and second angular segments 735 and 736 different from weights applied to projection data 745 acquired during the remaining angular segment 737. For example, a weight of 1 may be applied to the projection data 745 while a weight of 0.5 may be applied to each of the pieces of projection data 742 and 741.

The faster raw data for reconstruction of a cross-sectional CT image is obtained, the lesser motion artifact the obtained image has.

As the time to acquire raw data that is used to reconstruct a cross-sectional CT image decreases, the temporal resolution may increase.

Thus, if the X-ray generator 106 rotates at a constant velocity, a CT image reconstructed using a half reconstruction technique has fewer motion artifacts than a CT image reconstructed using a full reconstruction technique.

Thus, the gantry 640 may acquire first through third images by using a half reconstruction technique. Furthermore, if a fan angle of 60° is used, one period of an angular interval may be set to 240 degrees (180°+60°). In this case, as the X-ray generator 106 in the gantry 640 rotates around the object by 240 degrees, the gantry 640 acquires raw data corresponding to an angular interval of 240 degrees. Then, the image reconstructor 620 may reconstruct a cross-sectional CT image, e.g., the first image, the second image, and/or the third image from the raw data.

The CT apparatus 500 or 600 according to the exemplary embodiment may acquire first and second images by performing a CT scan in different scan modes. For example, a scan mode used for a CT scan may be at least one of a prospective scan mode and a retrospective scan mode. In detail, the type of a scan mode may be determined depending on whether a patient's cardiac cycle is regular or not. For a person having a regular cardiac cycle, the prospective scan mode may be used. In the prospective scan mode, raw data used for image reconstruction is acquired by regularly gating an electrocardiogram (ECG) signal (905 of FIG. 9). On the other hand, the retrospective scan mode may be used for a patient having arrhythmia and thus suffering from an irregular cardiac cycle. In the retrospective mode, raw data used for image reconstruction is acquired by irregularly gating the ECG signal 905.

Figure 8:
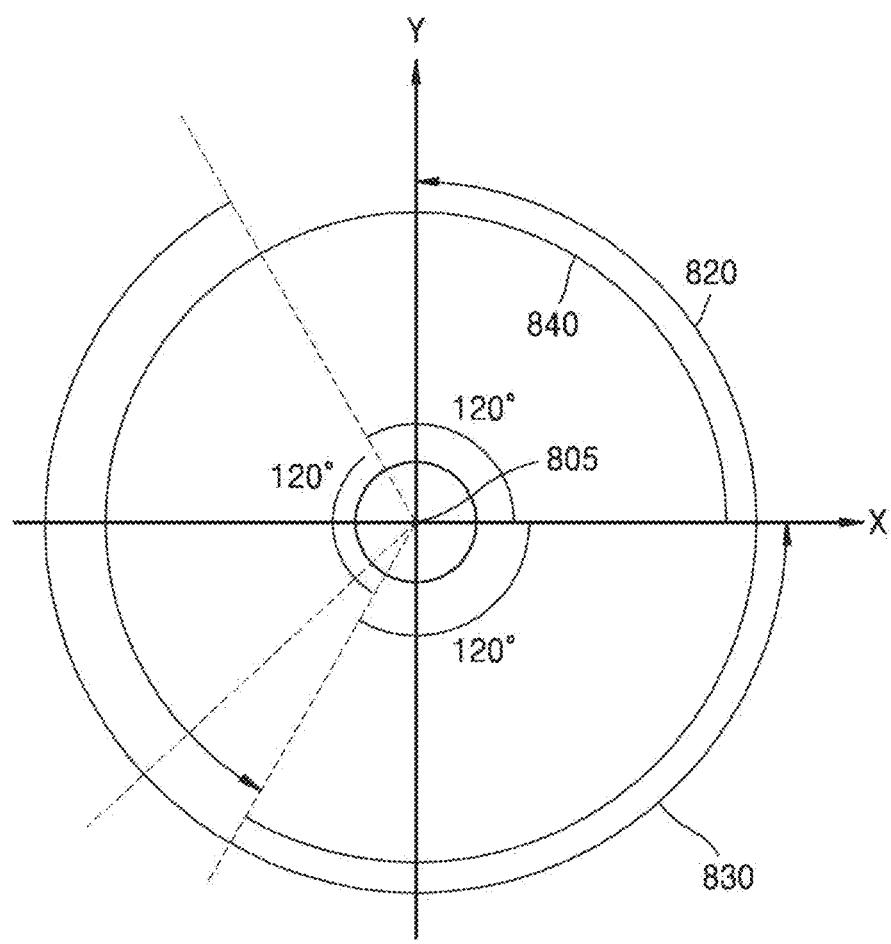
FIG. 8 is a diagram for explaining rotation of a beam during a time interval according to an exemplary embodiment.

FIG. 8 is a diagram for explaining acquisition of first through third images using a half reconstruction technique, according to an exemplary embodiment.

The second image is an image corresponding to a second time point that precedes a first time point corresponding to the first image. The third image is an image corresponding to a third time point that follows the first time point corresponding to the first image.

In detail, an angular interval for half reconstruction may be 180 degrees plus a fan angle, e.g., 240 degrees. The first image is reconstructed from raw data acquired by performing a CT scan on an object 805 during rotation of the X-ray generator 106 by a first angular interval 820. The second image is reconstructed from raw data acquired by performing a CT scan on the object 805 during rotation of the X-ray generator 106 by a second angular interval 830 preceding the first angular interval 820. The third image is reconstructed from raw data acquired by performing a CT scan during rotation of the X-ray generator 106 by a third angular interval 840 following the first angular interval 820.

Time points at which the first through third images are obtained corresponding to the first through third angular intervals 820 through 840 are respectively referred to as first through third time points. In detail, when the first angular interval 820 corresponds to a rotation during an interval between a time point t1 and a time point t2, the first time point may be a mid-point between the time point t1 and the time point t2 (i.e., (t2−t1)/2).

According to an exemplary embodiment, a difference between the first and second time points or a difference between the first and third time points may be equal to the amount of time during which X-ray generator 106 rotates by about 120° according to the exemplary embodiment of FIG. 8.

As shown in FIG. 8, the second image is reconstructed from raw data acquired over the second angular interval 830 that precedes the first angular interval 820 by an angle of 120°. The third image is reconstructed from raw data acquired over the third angular interval 840 that follows the first angular interval 820 by an angle of 120°.

Figure 9:
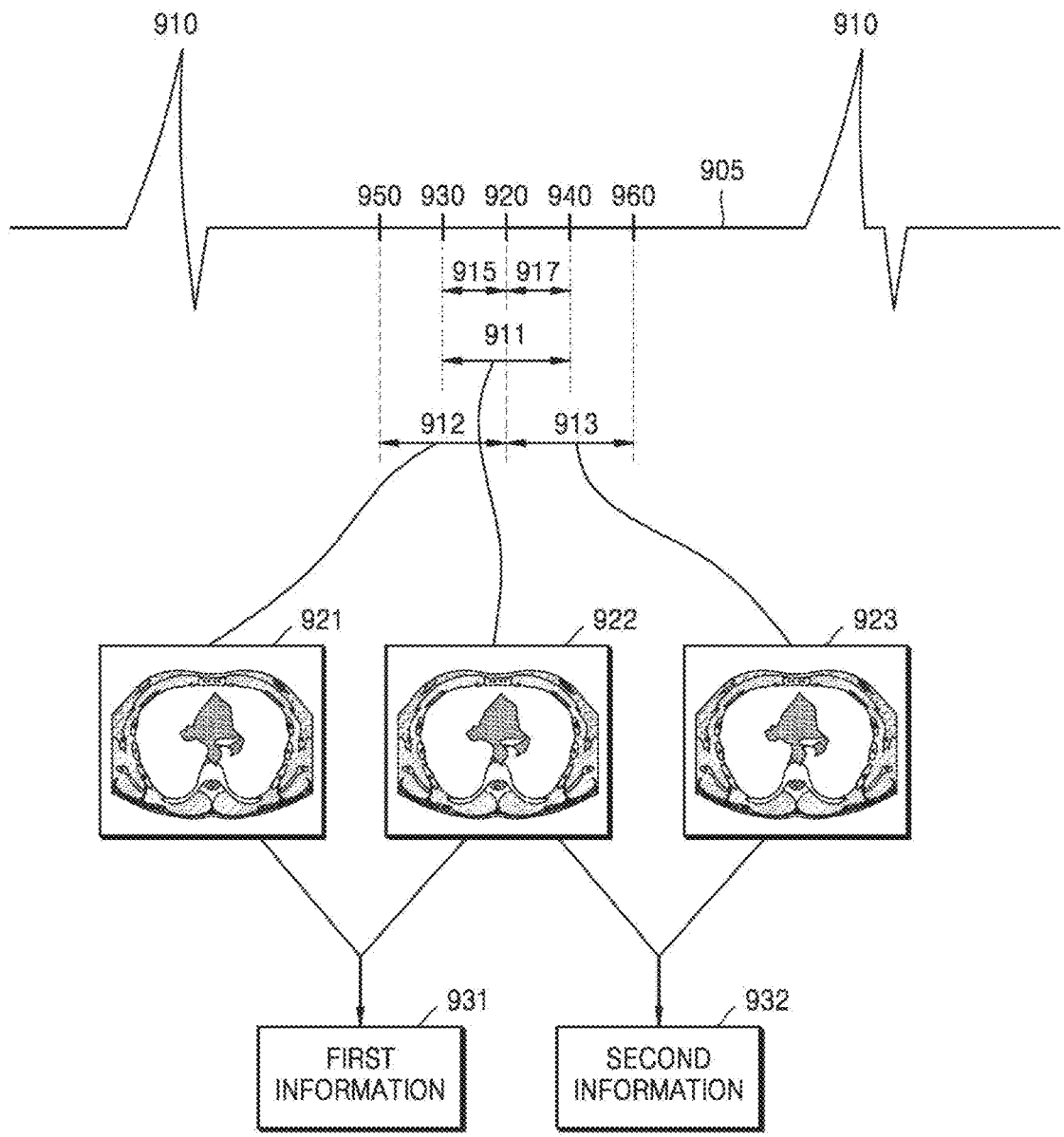
FIG. 9 is a diagram for explaining an operation of a CT apparatus according to an exemplary embodiment.

FIG. 9 is a diagram for explaining an operation of a CT apparatus according to an exemplary embodiment. FIG. 9 illustrates first through third images 921 through 923 captured at predetermined intervals based on the ECG signal 905.

During a CT scan of the heart, an interval during which the heart has least movement may be detected using the ECG signal 905. The ECG signal 905 is characterized by P, Q, R, S, and T peaks, and the heart has least movement during an interval that is after a lapse of a predetermined interval from an R peak 910. To avoid motion artifacts, the CT apparatus according to an exemplary embodiment may reconstruct an image by using projection data acquired during the interval.

According to exemplary embodiments, a time point when the heart moves the least may be set as a target time point, and the target time point may be set as a first time point 920. For example, a time point that is after a lapse of a predetermined time from the R peak 910 may be determined as the first time point 920. The second image 922 of an object is reconstructed from raw data acquired during a first interval 911 corresponding to the target time point 920. The first image 921 of the object is reconstructed from raw data acquired during a second interval 912 in which half reconstruction may be performed based on a second time point 930 that is at a time interval 915 before the first time point 920. The third image 923 of the object is reconstructed from raw data acquired during a third interval 913 in which half reconstruction may be performed based on a third time point 940 that is at a time interval 917 after the first time point 920. For example, if one period of an angular interval is 240°, the time intervals 915 and 917 may be respectively time required to rotate the X-ray generator by an angle of 120°.

The first, second, and third images 921, 922, and 923 may respectively depict the object at the first through third time points 930, 920, and 940.

FIG. 9 also illustrates first information 931 and second information 932. The first information 931 and the second information 932 are respectively acquired by respectively comparing the first and third images 921 and 923 with the second image 922. The first information 931 and the second information 932 respectively correspond to the amounts of movements of the heart between the first and second images 921 and 922 and between the first and third images 921 and 923. In detail, the first information 931 may be information indicating a relationship between time and the amount of movement of an object in a motion vector field between the first and second images 921 and 922. In this case, the amount of movement of the object may be measured using various movement measurement techniques such as rigid registration, optical flow, feature matching, and the like. The time may be a time interval set by the user, etc. For example, the time may be a time interval between the first and second time points 920 and 930.

Motion information of the object during a time interval between the second and third time points 930 and 940 may be acquired using the first information 931 and the second information 932. The motion information may include a motion of the object, i.e., a size, a shape, and a position of the object, at all time points between the second and third time points 930 and 940.

In detail, the motion information may include a motion vector field acquired using at least one of block matching, non-rigid registration, and vector flow.

A corrected target image may be obtained by correcting the second image 922 based on the motion information of the object. Back-projection is a process of reconstructing a cross-sectional image of an object by voxelizing projection data acquired by imaging the object by using X-rays at each angle as an X-ray generator rotates. Since time varies as the X-ray generator rotates, the size of the object may vary at the moment when the object is being scanned.

Thus, if the object moves during one period of an angular interval, a border of an object in a back-projected image may be blurred.

Since motion information includes information about movement of the object, the motion information may be used to detect the size of an object at an angle or time point when the object is imaged with X-rays.

Thus, the image reconstructor (620 of FIG. 6) warps a first image obtained by back-projection based on a status of movement contained in the motion information. In this case, the warping means adjusting the size of an object in the first image according to a predicted size by expanding or contracting the object.

Furthermore, according to an exemplary embodiment, a target image may be obtained by warping the object during back-projection instead of the first image obtained after back-projecting raw data.

According to an exemplary embodiment, it is possible to obtain motion information during a time interval between extra points, which is outside of the time interval between the second and third time points 930 and 940, by repeating the above-described process after setting the extra points, and to acquire a corrected image by using the motion information.

Figure 10:
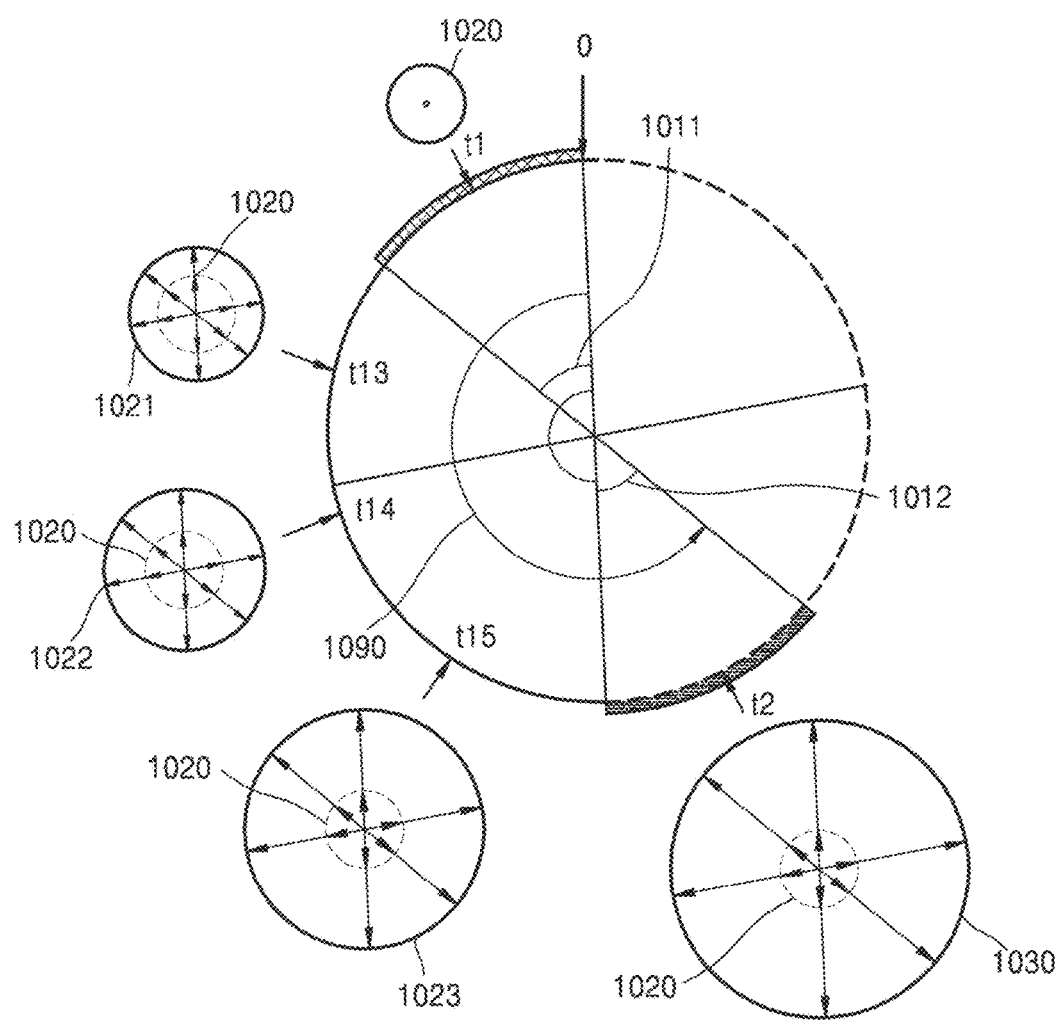
FIG. 10 is a diagram for explaining a change in movement of an object.

FIG. 10 is a diagram for explaining a change in movement of an object.

Motion information includes information about movement of an object from a second time point t2 to a third time point t3.

Referring to FIG. 10, during a rotation 1090 of the gantry by 180 degrees plus a fan angle 1011 or 1012, an object contained in a first image corresponding to a first time point t1 may have a first size 1020, and an object in a second image corresponding to a second time point t2 may have a second size 1030. Also, an object contained in other images corresponding to time points t13, t14, and t15 may have sizes 1021, 1022, and 1023, respectively.

Thus, since the size of the object may vary according to a time point when the object is imaged, simple back-projection of a sinogram acquired by scanning the object produces motion artifacts in a back-projected image.

Thus, by applying variations in the size of the object predicted based on the motion information to objects in the first through third images, a predicted image having reduced motion artifacts may be generated at an arbitrary time point. In detail, a target image may be reconstructed by warping at least one of the first through third images based on the motion information.

Figure 11:
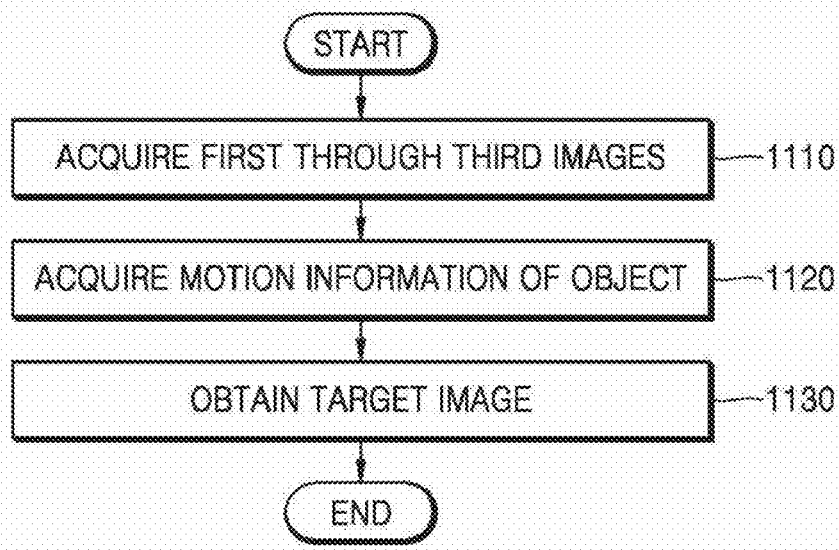
FIG. 11 is a flowchart of a method of reconstructing a CT image, according to an exemplary embodiment.

FIG. 11 is a flowchart of a method of reconstructing a CT image, according to an exemplary embodiment.

Referring to FIG. 11, according to an exemplary embodiment, a first image corresponding to a first time point, a second image corresponding to a second time point that is at a first time interval before the first time point, and a third image corresponding to a third time point that is at a second time interval after the first time point are acquired by performing a CT scan of an object (operation 1110). Operation 1110 may be performed by the data acquirer 610 of the CT apparatus 600.

First information indicating the amount of movement of the object is acquired based on the amount of movement of the object between the first and second images. Second information indicating the amount of movement of the object between the first and third images is acquired. Motion information of the object is obtained based on the first information and the second information (operation 1120). An improved target image may be obtained by correcting the first image based on the motion information acquired in operation 1120 (operation 1130). Operations 1120 and 1130 may be performed by the image reconstructor 620 of the CT apparatus 600.

Figure 12:
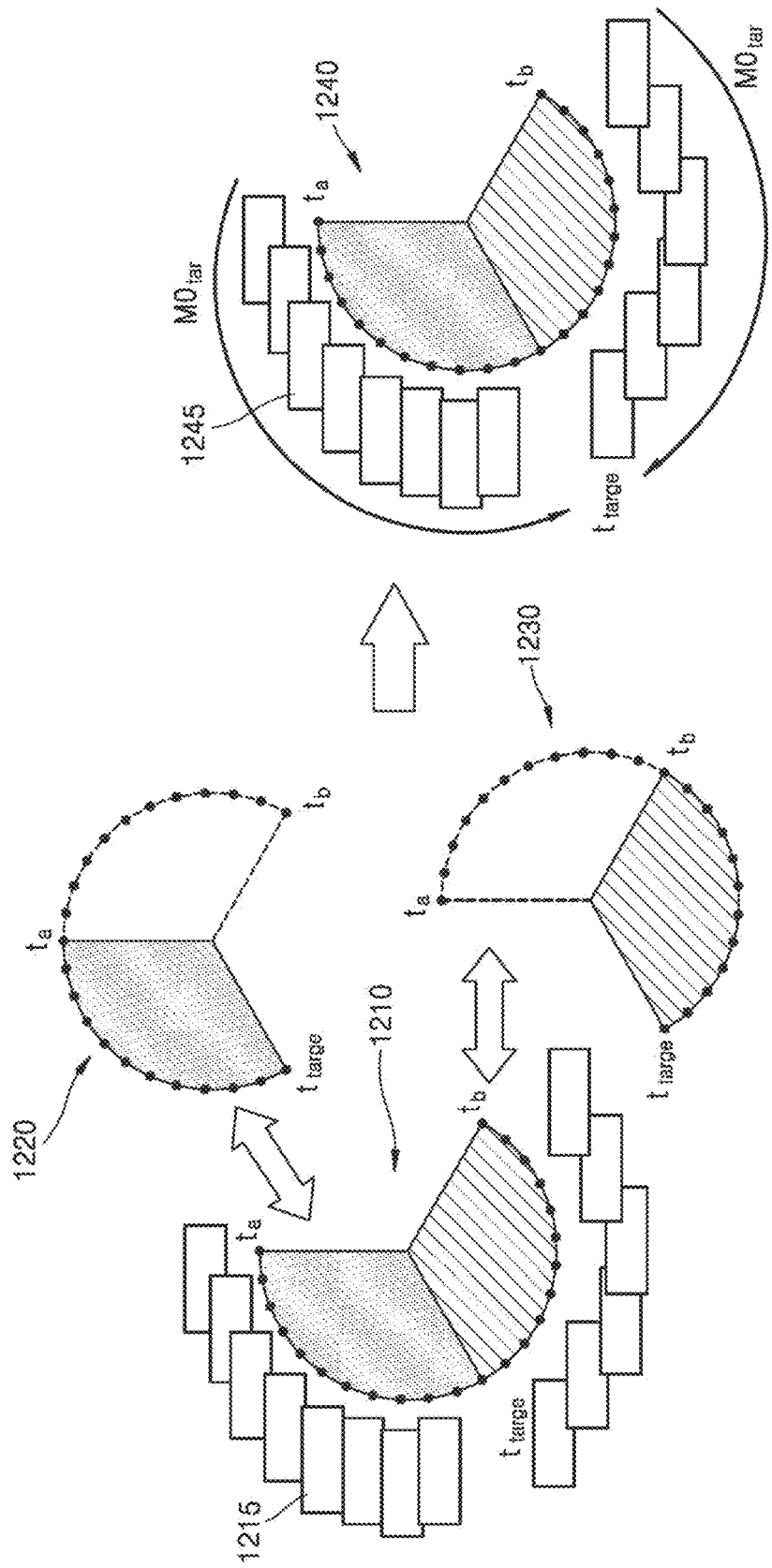
FIG. 12 is a diagram for explaining a process of extracting motion information and reconstructing an image at a target time point, according to an exemplary embodiment.

FIG. 12 is a diagram for explaining a process of extracting motion information and reconstructing an image at a target time point according to an exemplary embodiment.

Referring to FIG. 12, a target time point image 1210 represents an image of an object corresponding to a target time point $t_{target}$, and a pre time point image 1220 represents an image of the object corresponding to a time point $t_a$ before the target time point $t_{target}$. A post time point image 1230 represents an image of the object corresponding to a time point $t_b$ after the target time point $t_{target}$. In detail, the target time point image 1210, the pre time point image 1220, and the post time point image 1230 may be images respectively corresponding to the target time point $t_{target}$, the time point $t_a$, and the time point $t_b$.

The CT apparatus 500 according to the exemplary embodiment may extract motion information from all of views that may be used to obtain the target time point image 1210 by using the pre time point image 1220 and the post time point image 1230. In this case, movement or the size of an object at each interval may be corrected using the extracted motion information. As shown in images 1215 obtained at intervals, the motion information may be obtained by reflecting movements of an object respectively corresponding to the intervals. Furthermore, the motion information may be sizes or movements of the object respectively corresponding to the intervals.

The CT apparatus 500 may apply a corrected movement at each interval to the target time point image 1210 to acquire a corrected target time point image 1240 at a target time point $t_{target}$ by accurately reflecting a movement or size of the object for each interval. Thus, the target time point image 1240 may include images 1245 corresponding to intervals to which the corrected movement $MO_{tar}$ is applied.

Although it is described above that the corrected movement based on the motion information is applied to the target time point image 1210, this is only an example and the exemplary embodiments are not limited thereto. For example, the corrected movement based on the motion information may be applied to the pre time point image 1220 and/or the post time point image 1230 to obtain the corrected target time point image 1240.

The exemplary embodiments may be written as computer programs and may be implemented in general-use digital computers that execute the programs using a computer-readable recording medium.

Examples of the computer-readable recording medium include magnetic storage media (e.g., ROM, floppy disks, hard disks, etc.), optical recording media (e.g., compact-disk (CD)-ROMs, or digital versatile disks (DVDs)), etc.

At least one of the components, elements, modules or units represented by a block as illustrated in the drawings may be embodied as various numbers of hardware, software and/or firmware structures that execute respective functions described above, according to an exemplary embodiment. For example, at least one of these components, elements or units may use a direct circuit structure, such as a memory, processing, logic, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the above block diagrams, communication between the components, elements or units may be performed through the bus. Functional aspects of the above exemplary embodiments may be implemented in algorithms that execute on one or more processors. Furthermore, the components, elements or units represented by a block or processing steps may employ any number of related art techniques for electronics configuration, signal processing and/or control, data processing and the like.

Although a few embodiments have been shown and described, it would be appreciated by those skilled in the art that changes may be made in the exemplary embodiments without departing from the principles and spirit of the disclosure, the scope of which is defined in the claims and their equivalents.

What is claimed is:

1. A computed tomography (CT) apparatus comprising:
a data acquirer configured to acquire a first image corresponding to a first time point, a second image corresponding to a second time point, and a third image corresponding to a third time point based on a result of a CT scan on an object, wherein the first time point follows the second time point and precedes the third time point;
an image reconstructor configured to acquire motion information of the object based on an amount of movement of the object between the first and second images and an amount of movement of the object between the first and third images, and obtain a target image by correcting the first image based on the motion information; and
a display configured to display the target image,
wherein the image reconstructor is configured to reconstruct the first image by backprojecting raw data acquired during a time interval including the first time point and obtain the target image by correcting the first image in an image domain based on the motion information.

2. The CT apparatus of claim 1, wherein the image reconstructor is configured to obtain the target image by warping the first image in the image domain based on the motion information.

3. The CT apparatus of claim 1, wherein the image reconstructor is configured to correct the first image by perform warping during back-projection of raw data acquired during the time interval including the first time point based on the motion information, and obtain the target image.

4. The CT apparatus of claim 1, wherein the image reconstructor is configured to reconstruct the first through third images by using a half reconstruction technique.

5. The CT apparatus of claim 1, further comprising a CT gantry configured to emit an X-ray toward the object,
wherein an interval between the first and second time points and an interval between the first and third time points respectively correspond to time during which the CT gantry rotates by an angle corresponding to (180 degrees+a fan angle)/2.

6. The CT apparatus of claim 1,
wherein the image reconstructor is configured to acquire the motion information by estimating motions of the object during intervals between the first and second time points and between the first and third time points based on the amount of movement of the object between the first and second images and the amount of movement of the object between the first and third images, respectively.

7. The CT apparatus of claim 1, wherein the first time point is determined based on an electrocardiogram (ECG) signal.

8. The CT apparatus of claim 1, wherein the motion information comprises a motion vector field acquired using at least one from among block matching, non-rigid registration, and vector flow.

9. A method of reconstructing a computed tomography (CT) image, the method comprising:
acquiring a first image corresponding to a first time point, a second image corresponding to a second time point, and a third image corresponding to a third time point based on a result of a CT scan on an object, wherein the first time point follows the second time point and precedes the third time point;
acquiring motion information of the object based on an amount of movement of the object between the first and second images and an amount of movement of the object between the first and third images and obtaining a target image by correcting the first image based on the motion information; and
displaying the target image,
wherein the obtaining comprises reconstructing the first image by backprojecting raw data acquired during a time interval including the first time point and obtaining the target image by correcting the first image in an image domain based on the motion information.

10. The method of claim 9, wherein the obtaining the target image by correcting the first image in the image domain comprises warping the first image in the image domain based on the motion information.

11. The method of claim 9, wherein the obtaining comprises correcting the first image by warping during backprojection of raw data acquired during the time interval including the first time point based on the motion information and obtaining the target image.

12. The method of claim 9, wherein the obtaining comprises reconstructing the first through third images by using a half reconstruction technique.

13. The method of claim 9, wherein an interval between the first and second time points and an interval between the first and third time points respectively correspond to time during which a CT gantry, configured to emit an X-ray toward the object, rotates by an angle corresponding to (180 degrees+a fan angle)/2.

14. The method of claim 9, wherein the acquiring the motion information comprises acquiring the motion information by estimating motions of the object during intervals between the first and second time points and between the first and third time points based on the amount of movement of the object between the first and second images and the amount of movement of the object between the first and third images, respectively.

15. The method of claim 9, wherein the first time point is determined based on an electrocardiogram (ECG) signal.

16. The method of claim 9, wherein the motion information comprises a motion vector field acquired using at least one from among block matching, non-rigid registration, and vector flow.

17. The method of claim 9, further comprising displaying a screen comprising the target image.

18. A non-transitory computer-readable recording medium having recorded thereon a program comprising instructions, which, when executed by a computer, cause the computer to perform the method of claim 9.

* * * * *